(12) United States Patent
Yang et al.

(10) Patent No.: US 12,484,077 B2
(45) Date of Patent: Nov. 25, 2025

(54) PHYSICAL BROADCAST CHANNEL TRANSMISSION METHOD AND RELATED APPARATUS

(71) Applicant: Huawei Technologies Co., Ltd., Shenzhen (CN)

(72) Inventors: Hongjian Yang, Beijing (CN); Jinhuan Xia, Beijing (CN); Jiafeng Shao, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 574 days.

(21) Appl. No.: 17/662,315

(22) Filed: May 6, 2022

(65) Prior Publication Data

US 2022/0264524 A1   Aug. 18, 2022

Related U.S. Application Data

(63) Continuation of application No. PCT/CN2019/116886, filed on Nov. 8, 2019.

(51) Int. Cl.
*H04W 72/30* (2023.01)
*H04W 4/06* (2009.01)
(Continued)

(52) U.S. Cl.
CPC ............ *H04W 72/30* (2023.01); *H04W 4/06* (2013.01); *H04W 72/02* (2013.01); *H04W 72/0446* (2013.01)

(58) Field of Classification Search
CPC ... H04W 4/06; H04W 76/40; H04W 72/0446; H04W 72/30
See application file for complete search history.

(56) References Cited

U.S. PATENT DOCUMENTS 9,635,682 B2 * 4/2017 Kim .................... H04L 5/0007
2015/0296518 A1 * 10/2015 Yi ..................... H04W 72/0473
370/336
(Continued)

FOREIGN PATENT DOCUMENTS

| CN | 104205863 A | 12/2014 |
|---|---|---|
| ES | 2879693 T3 | 11/2021 |
| WO | 2018085660 A1 | 5/2018 |

OTHER PUBLICATIONS

Huawei et al., "Potential enhancement for CAS", 3GPP TSG RAN WG1 Meeting #98bis, R1-1910097, Chongqing, China, Oct. 14-20, 2019, 3 pages.

(Continued)

*Primary Examiner* — Sulaiman Nooristany
(74) *Attorney, Agent, or Firm* — Slater Matsil, LLP

(57) ABSTRACT

A network device determines downlink bandwidth configuration information corresponding to a terminal device; the network device sends a first physical broadcast channel to the terminal device in a plurality of cell acquisition subframes based on the downlink bandwidth configuration information, where a time interval between every two adjacent cell acquisition subframes in the plurality of cell acquisition subframes is greater than or equal to 30 ms. When a bandwidth configuration value corresponding to the downlink bandwidth configuration information is greater than or equal to a first threshold, the plurality of cell acquisition subframes in which the first physical broadcast channel is sent include at least one first cell acquisition subframe. At least five symbols of the first physical broadcast channel are transmitted in the first cell acquisition subframe.

13 Claims, 7 Drawing Sheets

(51) Int. Cl.
*H04W 72/02* (2009.01)
*H04W 72/0446* (2023.01)

(56) References Cited

U.S. PATENT DOCUMENTS

2018/0368054 A1* 12/2018 Sheng .................. H04L 5/0048
2020/0252756 A1* 8/2020 Rico Alvarino ...... H04W 48/12

OTHER PUBLICATIONS

Qualcomm Incorporated, "Analysis of CAS reception", 3GPP TSG RAN WG1 Meeting #98bis, R1-1910733, Chongqing, China, Oct. 14-20, 2019, 6 pages.

Shanghai Jiao Tong Univ., "Enhancements for PBCH reception in the CAS", 3GPP TSG RAN WG1 Meeting #98-Bis, R1-1910434, Chongqing, China, Oct. 14-20, 2019, 4 pages.

3GPP TS 36.211 V14.12.0 (Sep. 2019), 3rd Generation Partnership Project; Technical Specification Group Radio Access Network; Evolved Universal Terrestrial Radio Access (E-UTRA); Physical channels and modulation (Release 14), 196 pages.

3GPP TS 36.213 V15.7.0 (Sep. 2019), 3rd Generation Partnership Project; Technical Specification Group Radio Access Network; Evolved Universal Terrestrial Radio Access (E-UTRA); Physical layer procedures(Release 15), 551 pages.

3GPP TS 36.300 V15.7.0 (Sep. 2019), 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 15), 365 pages.

3GPP TS 36.331 V15.7.0 (Sep. 2019), 3rd Generation Partnership Project; Technical Specification Group Radio Access Network; Evolved Universal Terrestrial Radio Access (E-UTRA); Radio Resource Control (RRC); Protocol specification (Release 15), 962 pages.

Qualcomm Incorporated, "Summary of offline proposals", 3GPP TSG-RAN WG1 Meeting #98, R1-1909680, Prague, CZ, Aug. 26-30, 2919, 1 page.

Qualcomm Incorporated, "Support of longer numerologies for rooftop reception", 3GPP TSG RAN WG1 Meeting #98b, R1-1910732, Chongqing, China, Oct. 14-20, 2019, 11 pages.

* cited by examiner

PHYSICAL BROADCAST CHANNEL TRANSMISSION METHOD AND RELATED APPARATUS

CROSS-REFERENCE TO RELATED APPLICATIONS

This application is a continuation of International Application No. PCT/CN2019/116886, filed on Nov. 8, 2019. The afore-mentioned patent applications are hereby incorporated by reference in their entirety.

TECHNICAL FIELD

This application relates to the field of wireless communication technologies, and in particular, to a physical broadcast channel transmission method and a related apparatus.

BACKGROUND

The 3rd Generation Partnership Project (3GPP) introduces a multimedia broadcast multicast service (MBMS), to implement point-to-multipoint data transmission and improve air interface resource utilization. As defined in LTE, a physical multicast channel (PMCH) is used to transmit data of an MBMS. The MBMS is implemented by jointly sending MBMS signals in a same time domain resource, a same frequency domain resource, and a same space domain resource by a plurality of synchronized cells over a multimedia broadcast multicast service single frequency network (MBSFN), and then combination of the signals of the plurality of cells is naturally formed in the air. This improves a signal to interference plus noise ratio (SINR) on a UE side.

In an MBMS-dedicated cell, at least one non-MBSFN subframe is used to transmit, at an interval of 40 ms, a primary synchronization signal (PSS), a secondary synchronization signal (SSS), a physical broadcast channel (PBCH), a physical control format indicator channel (PCFICH), a physical downlink control channel (PDCCH), a physical downlink shared channel (PDSCH), and the like. The subframe is referred to as a cell acquisition subframe (CAS). A physical channel or signal in a CAS cannot be used to implement the combination of the signals of the plurality of cells. As a result, an SINR of the physical channel that is in the CAS and that is received by UE is lower than an SINR of a PMCH signal in an MBSFN subframe. Under a poor channel condition, the SINR of the physical channel (for example, a PBCH) that is in the CAS and that is received by the UE is lower than a demodulation threshold, resulting in a failure of blind detection of the PBCH. Therefore, the UE cannot normally receive the PBCH.

SUMMARY

This application provides a physical broadcast channel transmission method and a related apparatus, to improve a probability that a terminal device successfully receives a PBCH in an MBMS-dedicated cell.

According to a first aspect, an embodiment of this application provides a physical broadcast channel transmission method, including:

A network device sends, on an MBMS-dedicated carrier, a signal for a terminal device to access the MBMS-dedicated carrier to the terminal device; and the network device sends a first physical broadcast channel to the terminal device in a plurality of cell acquisition subframes, where a time interval between every two adjacent cell acquisition subframes in the plurality of cell acquisition subframes is greater than or equal to 30 ms, the plurality of cell acquisition subframes in which the first physical broadcast channel is sent include at least one first cell acquisition subframe, and at least five symbols of the first physical broadcast channel are transmitted in the first cell acquisition subframe.

In the technical solution of this embodiment of this application, the network device sends the first physical broadcast channel in the plurality of cell subframes, and repeatedly sends the first physical broadcast channel in at least one of the plurality of cell acquisition subframes in which the first physical broadcast channel is sent. In this way, the network device can increase, by repeatedly sending the first physical broadcast channel in the cell acquisition subframe, a probability of sending the first physical broadcast channel. Therefore, a probability that the terminal device receives the first physical broadcast channel is increased.

In some implementations, before the network device sends a first physical broadcast channel to the terminal device in a plurality of cell acquisition subframes, the method further includes:

The network device determines downlink bandwidth configuration information of the carrier or the cell.

That the network device sends a first physical broadcast channel to the terminal device in a plurality of cell acquisition subframes includes:

The network device sends the first physical broadcast channel to the terminal device in the plurality of cell acquisition subframes based on the downlink bandwidth configuration information, where when a bandwidth configuration value corresponding to the downlink bandwidth configuration information is greater than or equal to a first threshold, the plurality of cell acquisition subframes include at least one first cell acquisition subframe.

In this way, only when the bandwidth configuration value corresponding to the bandwidth configuration information is greater than the first threshold, the first physical broadcast channel is repeatedly sent in the cell acquisition subframe. This can prevent a case in which a small quantity of REs are used to transmit a PDSCH due to repeatedly sending the first physical broadcast channel in the cell acquisition subframe when a bandwidth is small.

In some implementations, when the bandwidth configuration value corresponding to the downlink bandwidth configuration information is greater than the first threshold and less than a second threshold, the plurality of cell acquisition subframes include at least one cell acquisition subframe that is not the first cell acquisition subframe, and the second threshold is greater than the first threshold. In this way, when the bandwidth configuration value corresponding to the bandwidth configuration information is greater than the first threshold and less than the second threshold, repeatedly sending the first physical broadcast channel in some cell acquisition subframes can increase the probability that the terminal device receives a first physical broadcast channel, and can prevent a case in which a small quantity of REs are used to transmit a PDSCH due to repeatedly sending the first physical broadcast channel in a cell acquisition subframe when the bandwidth is small.

In some implementations, when the bandwidth configuration value corresponding to the downlink bandwidth configuration information is greater than the second threshold, the plurality of cell acquisition subframes each are the first cell acquisition subframe, and the second threshold is greater than the first threshold. In this way, when the bandwidth configuration value corresponding to the downlink bandwidth configuration information is greater than the second threshold, that is, when the bandwidth value is sufficiently large, the probability that the terminal device receives the first physical broadcast channel may be increased more effectively by repeatedly sending the first physical broadcast channel in each cell acquisition subframe.

In some implementations, when the bandwidth configuration value corresponding to the downlink bandwidth configuration information is equal to the second threshold, the plurality of cell acquisition subframes include at least one cell acquisition subframe that is not the first cell acquisition subframe, or the plurality of cell acquisition subframes each are the first cell acquisition subframe.

In some implementations, before the network device sends a first physical broadcast channel to the terminal device in a plurality of cell acquisition subframes, the method further includes: The network device sends a second physical broadcast channel to the terminal device, where the second physical broadcast channel carries master information block-multimedia broadcast multicast service information, and the master information block-multimedia broadcast multicast service information includes the downlink bandwidth configuration information. In this way, the terminal device can obtain the master information block-multimedia broadcast multicast service information carried by the second physical broadcast channel, and obtain the downlink bandwidth configuration information in the master information block-multimedia broadcast multicast service information.

According to a second aspect, an implementation of this application provides a physical broadcast channel transmission method, including:

A terminal device accesses an MBMS-dedicated carrier; and the terminal device receives, in a plurality of cell acquisition subframes, a first physical broadcast channel sent by a network device, where a time interval between every two adjacent cell acquisition subframes in the plurality of cell acquisition subframes is greater than or equal to 30 ms, the plurality of cell acquisition subframes in which the first physical broadcast channel is sent include at least one first cell acquisition subframe, and at least five symbols of the first physical broadcast channel are transmitted in the first cell acquisition subframe.

In the technical solution of this embodiment of this application, the network device sends the first physical broadcast channel in the plurality of cell subframes, and repeatedly sends the first physical broadcast channel in at least one of the plurality of cell acquisition subframes in which the first physical broadcast channel is sent. In this way, the terminal can increase a probability of sending the first physical broadcast channel by repeatedly receiving the first physical broadcast channel in the cell acquisition subframe. Therefore, a probability that the terminal device receives the first physical broadcast channel can be increased.

In some implementations, before the terminal device receives, in a plurality of cell acquisition subframes, a first physical broadcast channel sent by a network device, the method further includes:

The terminal device determines downlink bandwidth configuration information.

That the terminal device receives, in a plurality of cell acquisition subframes, a first physical broadcast channel sent by the network device includes:

The terminal device receives the first physical broadcast channel in the plurality of cell acquisition subframes based on the downlink bandwidth configuration information, where when a bandwidth configuration value corresponding to the downlink bandwidth configuration information is greater than or equal to a first threshold, the plurality of cell acquisition subframes include at least one first cell acquisition subframe.

In this way, only when the bandwidth configuration value corresponding to the bandwidth configuration information is greater than the first threshold, the first physical broadcast channel is repeatedly transmitted in the cell acquisition subframe. This can prevent a case in which a small quantity of REs are used to transmit a PDSCH due to repeatedly transmitting the first physical broadcast channel in the cell acquisition subframe when a bandwidth is small.

In some implementations, when the bandwidth configuration value corresponding to the downlink bandwidth configuration information is greater than the first threshold and less than a second threshold, the plurality of cell acquisition subframes include at least one cell acquisition subframe that is not the first cell acquisition subframe, and the second threshold is greater than the first threshold. In this way, when the bandwidth configuration value corresponding to the bandwidth configuration information is greater than the first threshold and less than the second threshold, repeatedly transmitting the first physical broadcast channel in some cell acquisition subframes can increase the probability that the terminal device receives the first physical broadcast channel, and can prevent the case in which a small quantity of REs are used to transmit the PDSCH due to repeatedly transmitting the first physical broadcast channel in the cell acquisition subframe when the bandwidth is small.

In some implementations, when the bandwidth configuration value corresponding to the downlink bandwidth configuration information is greater than the second threshold, the plurality of cell acquisition subframes each are the first cell acquisition subframe. In this way, when the bandwidth configuration value corresponding to the downlink bandwidth configuration information is greater than the second threshold, that is, when the bandwidth value is sufficiently large, the probability that the terminal device receives the first physical broadcast channel may be increased more effectively by repeatedly sending the first physical broadcast channel in each cell acquisition subframe.

In some implementations, when the bandwidth configuration value corresponding to the downlink bandwidth configuration information is equal to the second threshold, the plurality of cell acquisition subframes include at least one cell acquisition subframe that is not the first cell acquisition subframe, or the plurality of cell acquisition subframes each are the first cell acquisition subframe.

In some implementations, before the network device sends, based on the downlink bandwidth configuration information, the first physical broadcast channel to the terminal device in the plurality of acquisition subframes, the method further includes: The terminal device receives a second physical broadcast channel sent by the network device, where the second physical broadcast channel carries master information block-multimedia broadcast multicast service information, and the master information block-multimedia broadcast multicast service information includes the downlink bandwidth configuration information. In this way, the terminal device can obtain the master information block-multimedia broadcast multicast service information carried by the second physical broadcast channel, and obtain the downlink bandwidth configuration information in the master information block-multimedia broadcast multicast service information.

According to a third aspect, an embodiment of this application provides a network device, including: a signal sending module, configured to send, on an MBMS-dedicated carrier, a signal for a terminal device to access the MBMS-dedicated carrier to the terminal device; and a channel sending module, configured to send a first physical broadcast channel to the terminal device in a plurality of cell acquisition subframes, where a time interval between every two adjacent cell acquisition subframes in the plurality of cell acquisition subframes is greater than or equal to 30 ms, the plurality of cell acquisition subframes in which the first physical broadcast channel is sent include at least one first cell acquisition subframe, and at least five symbols of the first physical broadcast channel are transmitted in the first cell acquisition subframe.

In some implementations, the network device further includes: a bandwidth configuration determining module, configured to determine downlink bandwidth configuration information of the carrier or a cell.

The channel sending module is specifically configured to: send the first physical broadcast channel to the terminal device in the plurality of cell acquisition subframes based on the downlink bandwidth configuration information, where when a bandwidth configuration value corresponding to the downlink bandwidth configuration information is greater than or equal to a first threshold, the plurality of cell acquisition subframes include at least one first cell acquisition subframe.

In some implementations, when the bandwidth configuration value corresponding to the downlink bandwidth configuration information is greater than the first threshold and less than a second threshold, the plurality of cell acquisition subframes include at least one cell acquisition subframe that is not the first cell acquisition subframe, and the second threshold is greater than the first threshold.

In some implementations, when the bandwidth configuration value corresponding to the downlink bandwidth configuration information is greater than the second threshold, the plurality of cell acquisition subframes each are the first cell acquisition subframe, and the second threshold is greater than the first threshold.

In some implementations, when the bandwidth configuration value corresponding to the downlink bandwidth configuration information is equal to the second threshold, the plurality of cell acquisition subframes include at least one cell acquisition subframe that is not the first cell acquisition subframe, or the plurality of cell acquisition subframes each are the first cell acquisition subframe.

In some implementations, the network device further includes: a bandwidth configuration information sending module, configured to send a second physical broadcast channel to the terminal device, where the second physical broadcast channel carries master information block-multimedia broadcast multicast service information, and the master information block-multimedia broadcast multicast service information includes the downlink bandwidth configuration information.

According to a fourth aspect, an implementation of this application provides terminal device, including: an access module, configured to access an MBMS-dedicated carrier, and a channel receiving module, configured to receive, in a plurality of cell acquisition subframes, a first physical broadcast channel sent by a network device, where a time interval between every two adjacent cell acquisition subframes in the plurality of cell acquisition subframes is greater than or equal to 30 ms, the plurality of cell acquisition subframes in which the first physical broadcast channel is sent include at least one first cell acquisition subframe, and at least five symbols of the first physical broadcast channel are transmitted in the first cell acquisition subframe.

In some implementations, the terminal device further includes: a configuration information determining module, configured to determine downlink bandwidth configuration information.

The channel receiving module is specifically configured to: receive the first physical broadcast channel in the plurality of cell acquisition subframes based on the downlink bandwidth configuration information, where when a bandwidth configuration value corresponding to the downlink bandwidth configuration information is greater than or equal to a first threshold, the plurality of cell acquisition subframes include at least one first cell acquisition subframe.

In some implementations, when the bandwidth configuration value corresponding to the downlink bandwidth configuration information is greater than the first threshold and less than a second threshold, the plurality of cell acquisition subframes include at least one cell acquisition subframe that is not the first cell acquisition subframe, and the second threshold is greater than the first threshold.

In some implementations, when the bandwidth configuration value corresponding to the downlink bandwidth configuration information is greater than the second threshold, the plurality of cell acquisition subframes each are the first cell acquisition subframe.

In some implementations, when the bandwidth configuration value corresponding to the downlink bandwidth configuration information is equal to the second threshold, the plurality of cell acquisition subframes include at least one cell acquisition subframe that is not the first cell acquisition subframe, or the plurality of cell acquisition subframes each are the first cell acquisition subframe.

In some implementations, the terminal device further includes: a bandwidth configuration information obtaining module, configured to receive a second physical broadcast channel sent by the network device, where the second physical broadcast channel carries master information block-multimedia broadcast multicast service information, and the master information block-multimedia broadcast multicast service information includes the downlink bandwidth configuration information.

According to a fifth aspect, an implementation of this application provides network device, including a processor and a memory. The memory is configured to store computer instructions. The processor executes the computer instructions stored in the memory, to enable the network device to perform the method according to any implementation of the first aspect.

According to a sixth aspect, an implementation of this application provides terminal device, including a processor and a memory. The memory stores computer instructions. The processor executes the computer instructions stored in the memory, to enable the terminal device to perform the method according to any implementation of the second aspect.

According to a seventh aspect, an implementation of this application provides a computer-readable storage medium in which computer instructions are stored. The computer instructions instruct a network device to perform the method according to any one implementation of the first aspect.

According to an eighth aspect, an implementation of this application provides a computer-readable storage medium in which computer instructions are stored. The computer instructions instruct a terminal device to perform the method according to any implementation of the second aspect.

BRIEF DESCRIPTION OF THE DRAWINGS

To describe the technical solutions in embodiments of this application or a conventional technology more clearly, the following briefly describes the accompanying drawings used in describing embodiments.

DETAILED DESCRIPTION OF ILLUSTRATIVE EMBODIMENTS

The technical solutions according to embodiments of this application are clearly and completely described in the following with reference to the accompanying drawings. In description in embodiments of this application, "/" means "or" unless otherwise specified. For example, A/B may represent A or B. In this specification, "and/or" describes only an association relationship for describing associated objects and represents that three relationships may exist. For example, A and/or B may represent the following three cases: Only A exists, both A and B exist, and only B exists. In addition, in the descriptions in embodiments of this application, "a plurality of" means two or more.

The terms "first" and "second" mentioned below are merely intended for a purpose of description, and shall not be understood as an indication or implication of relative importance or implicit indication of the number of indicated technical features. Therefore, a feature limited by "first" or "second" may explicitly or implicitly include one or more features. In the descriptions in embodiments of this application, unless otherwise specified, "a plurality of" means two or more than two.

Figure 1:
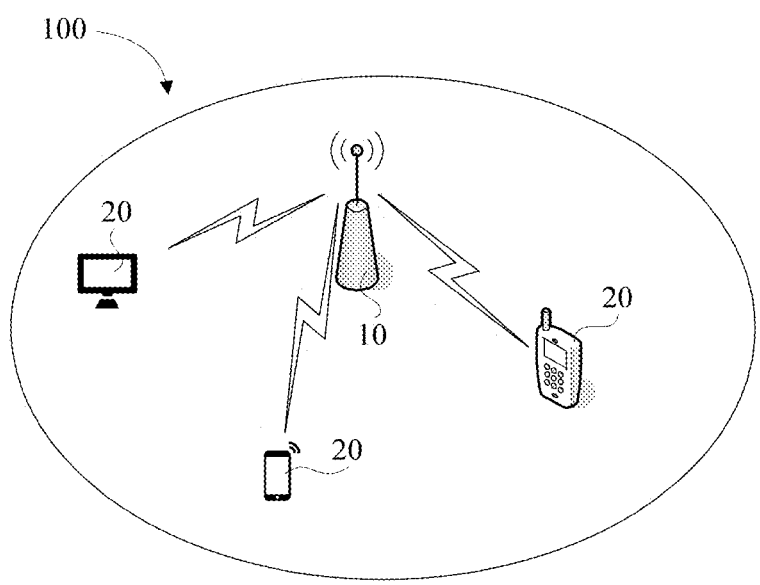
FIG. 1 is a diagram of a network architecture of a network system according to an embodiment of this application.

FIG. 1 is a diagram of a network architecture of a network system 100 provided in an embodiment of this application. As shown in FIG. 1, the network system 100 includes a network device 10 and one or more terminal devices 20.

The network device 10 is, for example, a device configured to transmit and receive signals. The network device 10 may be but is not limited to, for example, a base station. The terminal device is a device used by a user on a user side to receive a signal. The terminal device may be but is not limited to, for example, a mobile phone, a laptop, a tablet computer, or a large-screen television.

Figure 2:
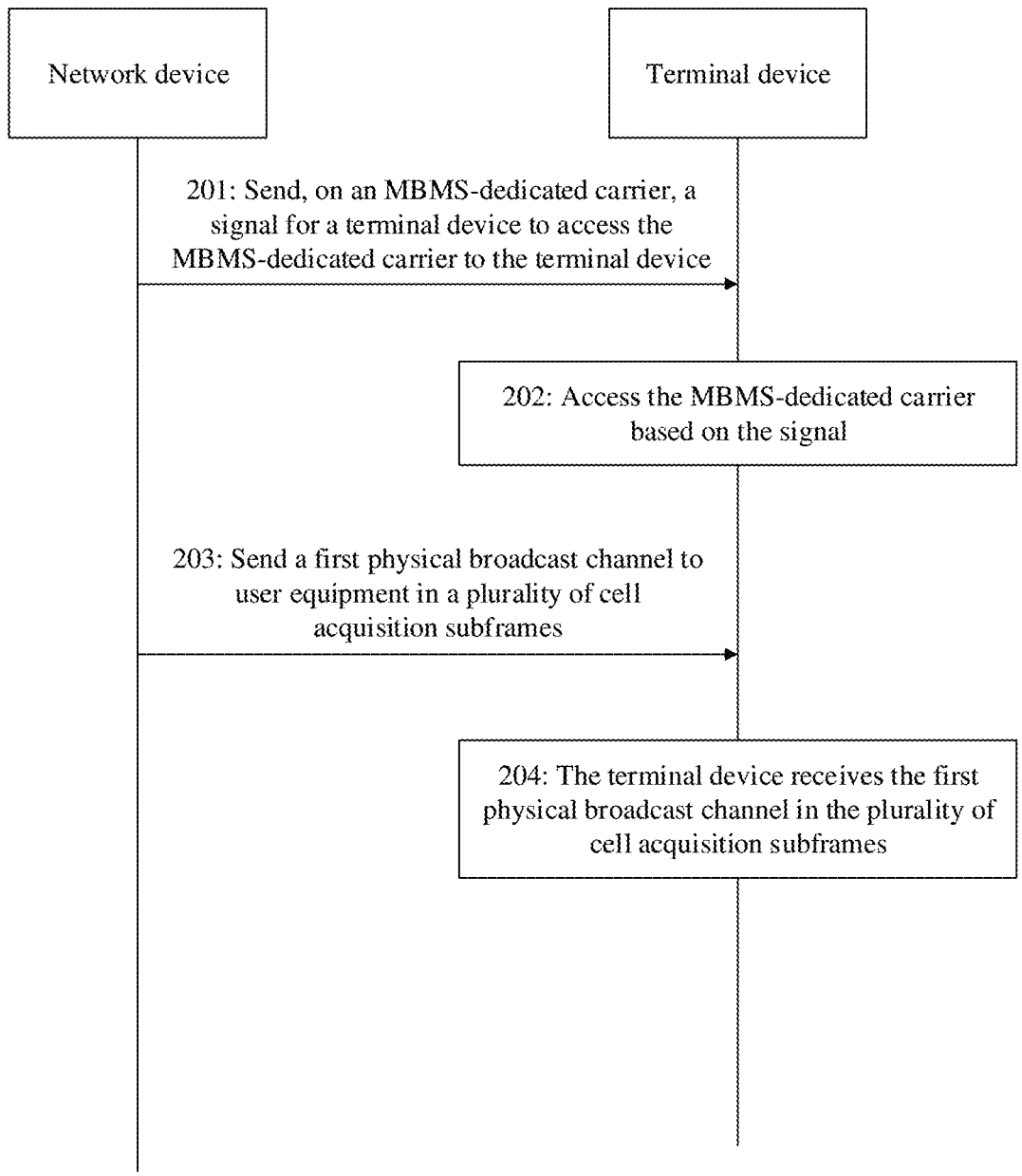
FIG. 2 is a schematic diagram of a flowchart of a physical broadcast channel transmission method according to an embodiment of this application.

FIG. 2 is a schematic diagram of a flowchart of a physical broadcast channel transmission method according to an embodiment of this application. The physical broadcast channel transmission method in this embodiment of this application may be used in an MBMS-dedicated cell, but a use of the method is not limited to the MBMS-dedicated cell. The physical broadcast channel transmission method includes the following steps.

201: A network device sends, on an MBMS-dedicated carrier, a signal for a terminal device to access the MBMS-dedicated carrier to the terminal device.

Before the network device sends a physical broadcast channel to the terminal device, the network device needs to send the signal for the terminal device to access the MBMS-dedicated carrier to the terminal device, so that the terminal accesses the MBMS-dedicated carrier based on the signal.

Specifically, the signal may be a synchronization signal. The network device sends the synchronization signal to the terminal device. The synchronization signal is used to indicate the terminal to access the MBMS-dedicated carrier.

202: The terminal device receives the signal and accesses the MBMS-dedicated carrier based on the signal.

203: The network device sends a first physical broadcast channel to the terminal device in a plurality of cell acquisition subframes, where a time interval between every two adjacent cell acquisition subframes in the plurality of cell acquisition subframes is greater than or equal to 30 ms.

The plurality of cell acquisition subframes in which the first physical broadcast channel is transmitted may be a plurality of consecutive cell acquisition subframes. The first physical broadcast channel transmitted in each cell acquisition subframe carries same information. In this way, the terminal device may receive the first physical broadcast channel in the plurality of consecutive cell acquisition subframes, so that a terminal can receive the first physical broadcast channel faster. Therefore, efficiency of receiving a physical broadcast channel by the terminal is improved.

An interval between two adjacent cell acquisition subframes may be, for example, 40 ms. In this way, there are four cell acquisition subframes within every 160 ms.

Figure 3:
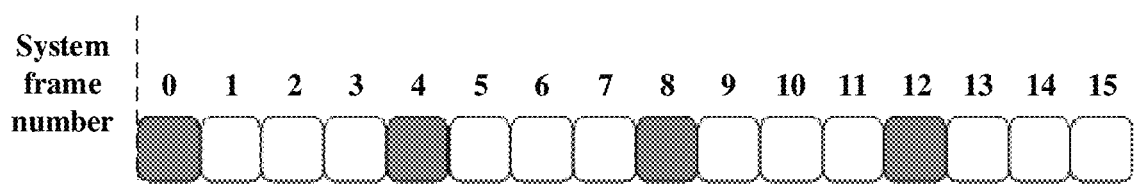
FIG. 3 is a schematic diagram of a scenario related to a physical broadcast channel transmission method according to an embodiment of this application.

As shown in FIG. 3, the plurality of cell acquisition subframes in which a physical broadcast channel is transmitted are cell acquisition subframes in a radio frame whose system frame number is an integer multiple of 4. In this case, the plurality of cell acquisition subframes in which the first physical broadcast channel is transmitted may be cell acquisition subframes in radio frames whose system frame numbers are respectively 0, 4, 8, and 12. It may be understood that a third physical broadcast channel may next be transmitted in cell acquisition subframes in radio frames whose system frame numbers are respectively 16, 20, 24 and 28. Symbols included in the third physical broadcast channel are different from those included in the first physical broadcast channel.

Figure 4:
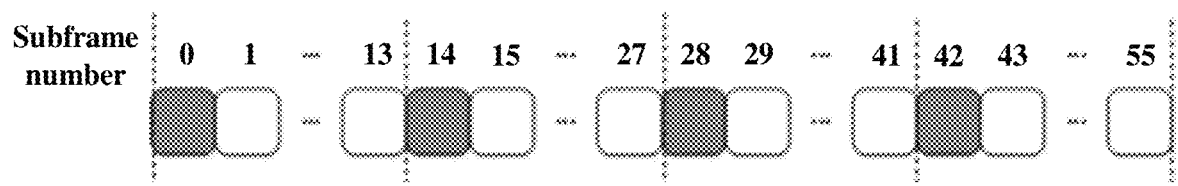
FIG. 4 is a schematic diagram of another scenario related to a physical broadcast channel transmission method according to an embodiment of this application.

As shown in FIG. 4, the plurality of cell acquisition subframes in which the physical broadcast channel is transmitted may be subframes whose subframe numbers are an integer multiple of 14. In this case, the plurality of cell acquisition subframes in which the first physical broadcast channel is transmitted may be subframes whose subframe numbers are respectively 0, 14, 28, and 42. It may be understood that the third physical broadcast channel may be transmitted in the next subframes whose subframe numbers are respectively 56, 70, 84 and 98. The symbols included in the third physical broadcast channel are different from those included in the first physical broadcast channel.

Figure 5:
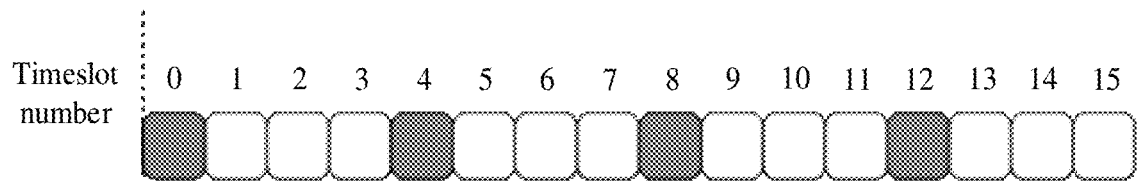
FIG. 5 is a schematic diagram of still another scenario related to a physical broadcast channel transmission method according to an embodiment of this application.

As shown in FIG. 5, the plurality of cell acquisition subframes in which the physical broadcast channel is transmitted may be subframes whose timeslot numbers are an integer multiple of 14. In this case, the plurality of cell acquisition subframes in which the first physical broadcast channel is transmitted may be subframes whose timeslot numbers are respectively 0, 14, 28, and 42. It may be understood that the third physical broadcast channel may be transmitted in the next subframes whose timeslot numbers are respectively 56, 70, 84, and 98. The symbols included in the third physical broadcast channel are different from those included in the first physical broadcast channel.

It should be noted that the first physical broadcast channel is any physical broadcast channel sent by the network device to the terminal device. A cell acquisition subframe in which a physical broadcast channel is transmitted is not limited to a subframe in the foregoing examples, and may be another subframe. The foregoing subframes are only used for explanation and are not construed as a limitation on this application.

In this embodiment of this application, a length of the radio frame may be 40 ms, each radio frame includes 14 subframes, each radio frame includes 14 timeslots, or each radio frame includes 15 timeslots.

Optionally, the subframe numbers and the timeslot numbers may be independently counted in each radio frame. For example, subframe numbers of subframes included in a radio frame 0 sequentially are 0, 1, 2, 3, 4, . . . , and 13, and subframe numbers of subframes included in a radio frame 1 sequentially are 0, 1, 2, 3, 4, . . . , and 13. Alternatively, subframe numbers and slot numbers in radio frames may be continuous numbers. For example, the subframe numbers of the subframes included in the radio frame 0 sequentially are 0, 1, 2, 3, 4, . . . , and 13, and the subframe numbers of the subframes included in the radio frame 1 sequentially are 14, 15, 16, 17, 18, . . . , and 27.

Figure 6:
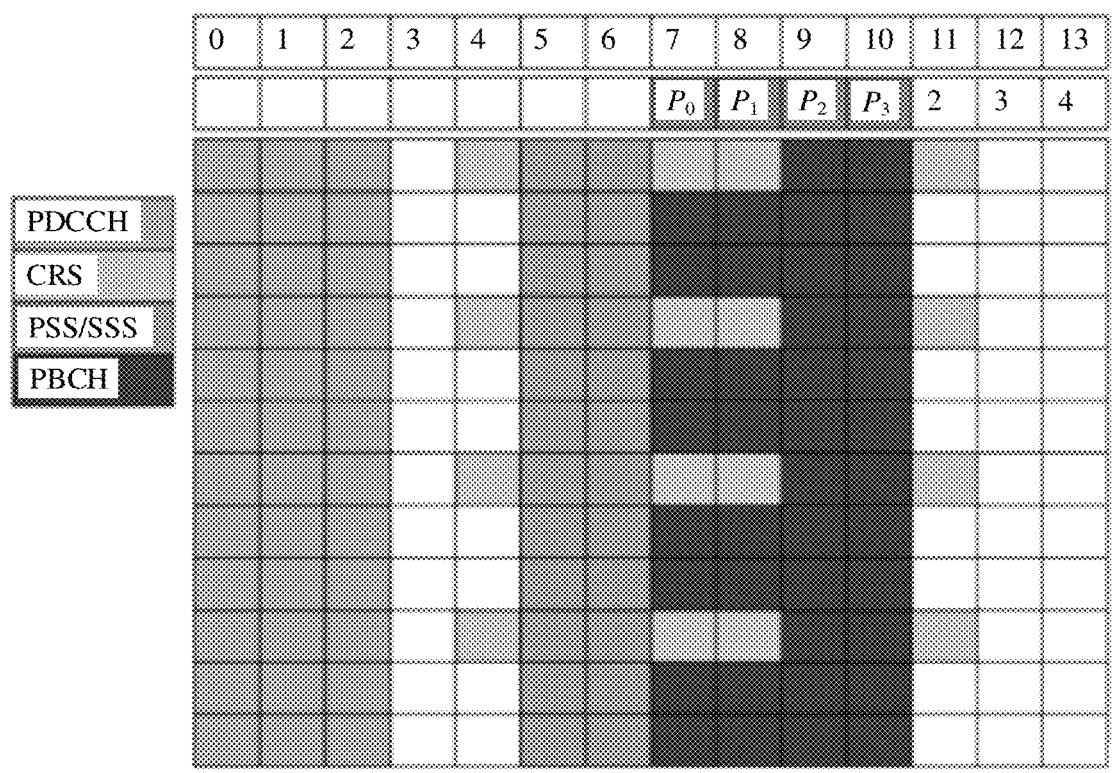
FIG. 6 is a schematic diagram of yet another scenario related to a physical broadcast channel transmission method according to an embodiment of this application.

When a network system includes a plurality of network devices, locations of repeated symbols corresponding to four symbols in each of physical broadcast channels transmitted by different network devices are different. Specifically, as shown in FIG. 6, symbols 7, 8, 9, and 10 respectively correspond to locations of original symbols of a physical broadcast channel that is not repeatedly sent in a subframe. The physical broadcast channel may be repeatedly sent in a subframe by using symbols 3, 4, 11, 12, and 13. A mapping relationship between the original symbols 7, 8, 9, and 10 of the physical broadcast channel and the symbols 3, 4, 11, 12, and 13 of the repeatedly sent physical broadcast channel is related to a cell ID (ID) of a network device. For example, for a network device whose cell ID is 0, an original PBCH symbol 7 may be mapped to a symbol 4 for repeated sending, an original PBCH symbol 8 may be mapped to a symbol 11 for repeated sending, an original PBCH symbol 9 may be mapped to a symbol 3 and a symbol 12 for repeated sending, and an original PBCH symbol 10 may be mapped to a symbol 13 for repeated sending; for a network device whose cell ID is 1, the original PBCH symbol 7 may be mapped to the symbol 4 for repeated sending, the original PBCH symbol 8 may be mapped to the symbol 11 for repeated sending, the original PBCH symbol 9 may be mapped to the symbol 3 and the symbol 13 for repeated sending, and the original PBCH symbol 10 may be mapped to the symbol 12 for repeated sending.

The plurality of cell acquisition subframes in which the first physical broadcast channel is sent include at least one first cell acquisition subframe. The first physical broadcast channel is transmitted in the first cell acquisition subframe by using at least five symbols. The first physical broadcast channel is mapped on four symbols. That the at least five symbols of the first physical broadcast channel are transmitted in the first cell acquisition subframe may be understood as that the first cell acquisition subframe is a cell acquisition subframe in which the first physical broadcast channel is repeatedly transmitted. That the first physical broadcast channel is repeatedly transmitted may be understood as that the first physical broadcast channel is transmitted at least twice in the first cell acquisition subframe.

The network device determines, based on a first cell acquisition subframe selecting manner agreed with the terminal device, one or more cell acquisition subframes that are first cell acquisition subframes and that are in the plurality of cell acquisition subframes in which the first physical broadcast channel is transmitted. The terminal device can determine a first cell acquisition subframe based on the selecting manner agreed with the network device, and repeatedly receive the first physical broadcast channel in the first cell acquisition subframe, but receive the first physical broadcast channel only once in another subframe that is not a first cell acquisition subframe.

The agreed selecting manner may be, for example, to agree on a requirement that needs to be met by a subframe number of the first cell acquisition subframe, to agree on a requirement that needs to be met by a system frame number of a radio frame in which the first cell acquisition subframe is located, or to agree on a requirement that needs to be met by a timeslot number of a subframe in which the first cell acquisition subframe is located. The agreed first cell acquisition subframe selecting manner is not limited herein.

For example, in the example shown in FIG. 3, the network device may determine, based on the agreed selecting manner, that a cell acquisition subframe in a radio frame whose system frame number is 4 and a cell acquisition subframe in a radio frame whose system frame number is 12 are first cell acquisition subframes. In this way, the network device sends the first physical channel to the terminal device in cell acquisition subframes in radio frames whose system frame numbers are respectively 0, 4, 8, and 12, and repeatedly sends symbols of the first physical channel in the cell acquisition subframes in the radio frames whose system frame numbers are respectively 4 and 12.

For another example, in the example shown in FIG. 4, the network device may determine, based on the agreed selecting manner, that subframes whose subframe numbers are respectively 14 and 42 are first cell acquisition subframes. The network device may transmit the first physical channel in the cell acquisition subframes whose subframe numbers are respectively 0, 14, 28, and 42, and repeatedly transmit the symbols of the first physical channel in the cell acquisition subframes whose subframe numbers are respectively 14 and 42.

204: The terminal device receives the first physical broadcast channel in the plurality of cell acquisition subframes.

The terminal device determines, based on the agreed selecting manner, the first cell acquisition subframe in the plurality of cell acquisition subframes in which the first physical broadcast channel is transmitted. Then, the terminal device repeatedly receives the first physical broadcast channel in the first cell acquisition subframe, and receives the first physical broadcast channel only once in another cell acquisition subframe that is not a first cell acquisition subframe.

For example, corresponding to the example shown in FIG. 3, the terminal device determines, based on the agreed selecting manner, that the cell acquisition subframes in the radio frames whose system frame numbers are respectively 4 and 12 are first cell acquisition subframes. In this way, the terminal device sends the first physical channel to the terminal device in the cell acquisition subframes in the radio frames whose system frame numbers are respectively 0, 4, 8, and 12, and repeatedly sends the symbols of the first physical channel in the cell acquisition subframes in the radio frames whose system frame numbers are respectively 4 and 12.

For another example, corresponding to the example shown in FIG. 4, the terminal device determines, based on the agreed selecting manner, that the subframes whose subframe numbers are respectively 14 and 42 are first cell acquisition subframes. The terminal device may receive the first physical channel in the cell acquisition subframes whose subframe numbers are respectively 0, 14, 28, and 42, and repeatedly receive the symbols of the first physical channel in the cell acquisition subframes whose subframe numbers are respectively 14 and 42.

In the technical solution of this embodiment of this application, the network device sends the first physical broadcast channel in the plurality of cell subframes, and repeatedly sends the first physical broadcast channel in at least one of the plurality of cell acquisition subframes in which the first physical broadcast channel is sent. In this way, the network device can increase, by repeatedly sending the first physical broadcast channel in a subframe, a probability of sending the first physical broadcast channel. Therefore, a probability that the terminal device receives the first physical broadcast channel can be increased.

Figure 7:
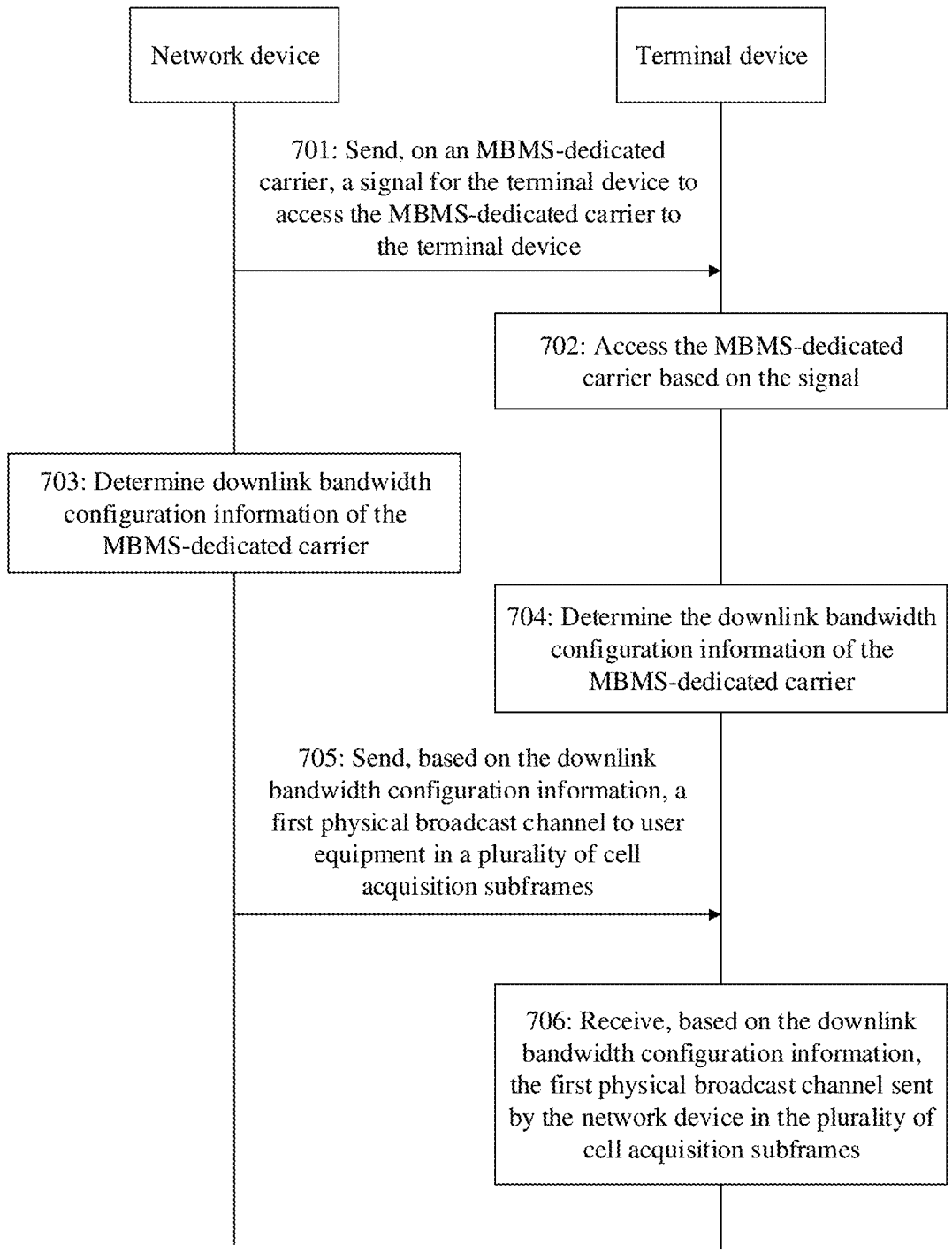
FIG. 7 is a schematic diagram of another flowchart of a physical broadcast channel transmission method according to an embodiment of this application.

FIG. 7 is a schematic diagram of another flowchart of a physical broadcast channel transmission method provided in this application. The physical broadcast channel transmission method includes the following steps.

701: A network device sends, on an MBMS-dedicated carrier, a signal for a terminal device to access the MBMS-dedicated carrier to the terminal device.

702: The terminal device receives the signal and accesses the MBMS-dedicated carrier based on the signal.

703: The network device determines downlink bandwidth configuration information of the MBMS-dedicated carrier.

The network device may obtain bandwidth configuration information of a carrier corresponding to the terminal device or bandwidth configuration information of a serving cell of the terminal device. The network device may determine, based on the downlink bandwidth configuration information corresponding to the terminal device, a policy of sending a physical broadcast channel to the terminal device.

The downlink bandwidth information includes a bandwidth configuration value $N\_RB\char`\^DL$. There is a positively related one-to-one correspondence between the bandwidth configuration value and a system bandwidth value. For example, when the bandwidth configuration value is 6, a corresponding bandwidth value is 1.4 MHz; when the bandwidth configuration value is 15, a corresponding bandwidth value is 3 MHz; when the bandwidth configuration value is 25, a corresponding bandwidth value is 5 MHz; when the bandwidth configuration value is 50, a corresponding bandwidth value is 10 MHz; when the bandwidth configuration value is 75, a corresponding bandwidth value is 15 MHz; and when the bandwidth configuration value is 100, a corresponding bandwidth value is 20 MHz.

Preferably, after determining the downlink bandwidth configuration information corresponding to the terminal device, the network device may send the downlink bandwidth configuration information to the terminal device, so that the terminal device obtains the downlink bandwidth configuration information and determines, based on the downlink bandwidth configuration information, a policy of receiving a physical broadcast channel.

Specifically, the network device sends a second physical broadcast channel to the terminal device. The second physical broadcast channel carries master information block-multimedia broadcast multicast service (MIB-MBMS) information. The MIB-MBMS information includes the downlink bandwidth configuration information.

The network device may repeatedly send the second physical broadcast channel in one cell acquisition subframe, separately send the second physical broadcast channel in a plurality of cell acquisition subframes, or separately send the second physical broadcast channel in a plurality of cell acquisition subframes and repeatedly send the second physical broadcast channel in at least one cell acquisition subframe. Repeatedly sending the second physical broadcast channel refers to transmitting the second broadcast channel in a cell acquisition subframe by using at least 5 symbols. Symbols of the second physical broadcast channel may be distributed in different frames, and/or subframes, and/or timeslots. For example, the network device may separately send the second physical broadcast channel to the terminal device in one or more subframes whose system frame numbers are respectively 0, 4, 8, and 12, for example, in a subframe 0. The network device may alternatively send the second physical broadcast channel to the terminal device in each of the subframes whose system frame numbers are respectively 0, 4, 8, and 12, and repeatedly send the symbols of the second physical broadcast channel in the subframe whose system frame number is 0. In this way, a probability that the terminal device successfully receives the second physical broadcast channel may be increased, and the terminal device obtains the MIB-MBMS information in the second physical broadcast channel.

It should be noted that the step 703 may be performed before the step 701, after the step 701 and before the step 702, after the step 702, or simultaneously with the step 701 or the step 702.

704: The terminal device determines the downlink bandwidth configuration information of the MBMS-dedicated carrier.

Correspondingly, the terminal device may receive the downlink bandwidth configuration information sent by the network device, to obtain the downlink bandwidth configuration information. Specifically, the terminal device receives the second physical broadcast channel in at least one cell acquisition subframe. The second physical broadcast channel carries the MIB-MBMS information that includes the downlink bandwidth configuration information. In this way, the terminal can obtain the downlink bandwidth configuration information from the second physical broadcast channel.

The terminal device may perform blind detection on the second physical broadcast channel in one or more of a predefined frame, subframe, timeslot, symbol, RB, and RE. For example, the terminal device may perform blind detection at a symbol 0, and/or a symbol 1, and/or a symbol 2, and/or a symbol 3 in a timeslot 1 of the subframe 0 that is in a radio frame 0, and/or a radio frame 4, and/or a radio frame 8, and/or a radio frame 12, to obtain the second physical broadcast channel and accordingly obtain the MIB-MBMS information carried in the second physical broadcast channel. Specifically, the terminal device may obtain, from the MIB-MBMS information, the downlink bandwidth configuration information of the MBMS-dedicated carrier. The bandwidth configuration value in the downlink bandwidth configuration information may be but is not limited to one of 6, 15, 25, 50, 75, and 100.

705: The network device sends a first physical broadcast channel to the terminal device in the plurality of cell acquisition subframes based on the downlink bandwidth configuration information.

For an explanation of a plurality of cell acquisition subframes in which the first physical broadcast channel is transmitted, refer to the foregoing embodiments. To avoid redundancy, details are not described herein again. The first physical channel may carry the MIB-MBMS information.

Specifically, the network device compares the bandwidth configuration value corresponding to the downlink bandwidth configuration information and a first threshold, and then determines a policy of sending a first physical broadcast channel based on a comparison result. There is a positively related one-to-one correspondence between the bandwidth configuration value and a bandwidth value. The first threshold corresponds to a first bandwidth threshold. The network device may alternatively determine the policy of sending a first physical broadcast channel based on the bandwidth value and the first bandwidth threshold.

When the bandwidth configuration value corresponding to the downlink bandwidth configuration information is greater than or equal to the first threshold, the plurality of cell acquisition subframes include at least one first cell acquisition subframe. For an explanation of the first cell acquisition subframe, refer to the foregoing embodiments. In this way, when the bandwidth configuration value corresponding to the downlink bandwidth configuration information is greater than the first threshold, the policy of sending a first physical broadcast channel is that the network device transmits the first physical broadcast channel in the plurality of cell acquisition subframes, and repeatedly transmits the first physical broadcast channel in at least one cell acquisition subframe in which the first physical broadcast channel is transmitted.

More specifically, when the bandwidth configuration value corresponding to the downlink bandwidth configuration information is greater than the first threshold and less than a second threshold, the plurality of cell acquisition subframes in which the first physical broadcast channel is transmitted include at least one cell acquisition subframe that is not a first cell acquisition subframe, and the second threshold is greater than the first threshold. When the bandwidth configuration value corresponding to the downlink bandwidth configuration information is greater than the second threshold, the plurality of cell acquisition subframes in which the first physical broadcast channel is transmitted each are a first cell acquisition subframe. In other words, when the bandwidth configuration value corresponding to the downlink bandwidth configuration information is greater than the first threshold and less than the second threshold, the policy of sending a first physical broadcast channel is that the network device transmits the first physical broadcast channel in the plurality of cell acquisition subframes, and repeatedly sends the first physical broadcast channel in some of the cell acquisition subframes in which the first physical broadcast channel is transmitted. When the bandwidth configuration value corresponding to the downlink bandwidth configuration information is greater than the second threshold, the policy of sending a first physical broadcast channel is that the network device repeatedly sends the first physical broadcast channel in each cell acquisition subframe in which the first physical broadcast channel is transmitted.

When the bandwidth configuration value corresponding to the downlink bandwidth configuration information is greater than the first threshold and less than the second threshold, the network device determines, based on a first cell acquisition subframe selecting manner agreed with the terminal device, one or more cell acquisition subframes that are first cell acquisition subframes and that are in the plurality of cell acquisition subframes in which the first physical broadcast channel is transmitted. In this way, when the bandwidth configuration value corresponding to the downlink bandwidth configuration information is greater than the first threshold and less than the second threshold, the terminal device can determine the first cell acquisition subframe based on the selecting manner agreed with the network device, and repeatedly receive the first physical broadcast channel in the first cell acquisition subframe, but receive the first physical broadcast channel only once in another subframe that is not a first cell acquisition subframe.

In the example shown in FIG. 4, the cell acquisition subframes in which the first physical broadcast channel is transmitted include four subframes whose subframe numbers are respectively 0, 14, 28, and 42. When the bandwidth configuration value corresponding to the downlink bandwidth configuration information is greater than the first threshold and less than the second threshold, the network device may repeatedly transmit the first physical broadcast channel in some of the four cell acquisition subframes and transmit the first cell acquisition subframe only once in the other subframes. To be specific, the network device may use, based on the agreed selecting manner, that one, two, or three of the four subframes as first cell acquisition subframes, and transmit the first physical broadcast channel at least twice in each first cell acquisition subframe, but transmit the first physical broadcast channel only once in the other subframes that are not first cell acquisition subframes. In this way, the terminal device may determine a first cell acquisition subframe based on the agreed selecting manner, and repeatedly receive the first physical broadcast channel in the first cell acquisition subframe, but receive the first physical broadcast channel only once in the other cell acquisition subframes.

For example, the network device determines, based on the agreed selecting manner, that the subframe 0 is the first cell acquisition subframe. The network device repeatedly transmits the first physical broadcast channel in the subframe 0, and transmits the first physical broadcast channel only once in the subframes whose subframe numbers are respectively 14, 28, and 42. In this way, based on the agreed selecting manner, the terminal device also repeatedly receives the first physical broadcast channel only in the subframe 0, and receives the first physical broadcast channel only once in each of the subframes 14, 28, and 42.

For another example, the network device determines, based on the agreed selecting manner, that the subframes 0 and 28 are first cell acquisition subframes. The network device repeatedly transmits the first physical broadcast channel in the subframes 0 and 28, and transmits the first physical broadcast channel only once in the subframes 14 and 42. In this way, based on the agreed selecting manner, the terminal device also repeatedly receives the first physical broadcast channel in the subframes 0 and 28, and receives the first physical broadcast channel only once in the subframes 14 and 42.

For another example, the network device determines, based on the agreed selecting manner, that the subframes 0, 14, and 28 are first cell acquisition subframes. The network device repeatedly transmits the first physical broadcast channel in the subframes 0, 14, and 28, and transmits the first physical broadcast channel only once in the subframe 42. In this way, based on the agreed selecting manner, the terminal device also repeatedly receives the first physical broadcast channel in the subframes 0, 14, and 28, and receives the first physical broadcast channel only once in the subframe 42.

For another example, based on the agreed selecting manner, the subframes 14 and 42 are first cell acquisition subframes. The network device repeatedly transmits the first physical broadcast channel in the subframes 14 and 42, and transmits the first physical broadcast channel only once in the subframes 0 and 28. In this way, based on the agreed selecting manner, the terminal device also repeatedly receives the first physical broadcast channel in the subframes 14 and 42, and receives the first physical broadcast channel only once in the subframes 0 and 28.

The example shown in FIG. 4 is still used for description. The cell acquisition subframes in which the first physical broadcast channel is transmitted include four subframes whose subframe numbers are respectively 0, 14, 28, and 42. When the bandwidth configuration value corresponding to the downlink bandwidth configuration information is greater than the second threshold, the four cell acquisition subframes are first cell acquisition subframes. The network device repeatedly transmits the first physical broadcast channel in each of the four subframes. In other words, the network device transmits the first physical broadcast channel at least twice in each of the four subframes.

The first threshold and the second threshold may be two different positive integers, and the second threshold is greater than the first threshold. Preferably, the first threshold may be but is not limited to one of 6, 15, 25, 50, 75, or 100. The second threshold may be but is not limited to one of 15, 25, 50, 75, or 100.

When the bandwidth configuration value corresponding to the downlink bandwidth configuration information is equal to the second threshold, the plurality of cell acquisition subframes in which the first physical broadcast channel is transmitted include at least one cell acquisition subframe that is not a first cell acquisition subframe, the second threshold is greater than the first threshold, or the plurality of cell acquisition subframes in which the first physical broadcast channel is transmitted each are a first cell acquisition subframe. In other words, the policy of sending a first physical broadcast channel when the bandwidth configuration value corresponding to the downlink bandwidth configuration information is equal to the second threshold may be the same as the policy of sending a first physical broadcast channel when the bandwidth configuration value corresponding to the downlink bandwidth configuration is greater than the second threshold, or may be the same as the policy of sending a first physical broadcast channel when the bandwidth configuration value corresponding to the downlink bandwidth configuration information is less than the second threshold and greater than the first threshold.

When the bandwidth configuration value corresponding to the downlink bandwidth configuration information is less than the first threshold, the plurality of cell acquisition subframes in which the first physical broadcast channel is transmitted each are a second cell acquisition subframe. A maximum of four symbols of the first physical broadcast channel are transmitted in the second cell acquisition subframe. In other words, when the bandwidth configuration value corresponding to the downlink bandwidth configuration information is less than the first threshold, the policy of sending a first physical broadcast channel is that the network device transmits the first physical broadcast channel only once in each cell acquisition subframe in which the first physical broadcast channel is transmitted. It may be understood that the first threshold corresponds to the first bandwidth threshold. When the bandwidth configuration value corresponding to the downlink bandwidth configuration information is less than the first threshold, a bandwidth value of a carrier corresponding to the terminal device or a bandwidth value of a serving cell of the terminal device is less than the first bandwidth threshold. In this case, the network device sends the first physical broadcast channel only once in each cell acquisition subframe. This can prevent a case in which a small quantity of REs are used to transmit a PDSCH due to repeatedly transmitting a physical broadcast channel in the cell acquisition subframe when a bandwidth is small.

When the bandwidth configuration value corresponding to the downlink bandwidth configuration information is equal to the first threshold, the plurality of cell acquisition subframes in which the first physical broadcast channel is transmitted include at least one cell acquisition subframe that is not a first cell acquisition subframe, or the plurality of cell acquisition subframes in which the first physical broadcast channel is transmitted each are a second cell acquisition subframe. In other words, the policy of sending a first physical broadcast channel when the bandwidth configuration value corresponding to the downlink bandwidth configuration information is equal to the first threshold may be the same as the policy of sending a first physical broadcast channel when the bandwidth configuration value corresponding to the downlink bandwidth configuration information is greater than the first threshold and less than the second threshold, or may be the same as the policy of sending a first physical broadcast channel when the bandwidth configuration value corresponding to the downlink bandwidth configuration information is less than the first threshold.

It should be noted that the policy of sending a first physical broadcast channel, obtained based on the bandwidth configuration value, the first threshold, and the second threshold, may also be used for transmitting another physical broadcast channel.

Specifically, the network device may determine the policy of sending a physical broadcast channel based on the bandwidth configuration value corresponding to the downlink bandwidth configuration information, the first threshold, and the second threshold. There is a positively related relationship or a one-to-one correspondence between the bandwidth configuration value and the bandwidth value. The first threshold corresponds to one first bandwidth threshold. The second threshold corresponds to one first bandwidth threshold. The network device may alternatively determine the policy of sending a physical broadcast channel based on the bandwidth value, the first bandwidth threshold, and the second bandwidth threshold.

706: The terminal device receives, based on the downlink bandwidth configuration information, the first physical broadcast channel, sent by the network device, in the plurality of cell acquisition subframes.

It may be understood that the first physical broadcast channel is any physical broadcast channel sent by the network device. The terminal device may obtain a same physical broadcast channel in a plurality of cell acquisition subframes.

When the network device sends a same physical broadcast channel in a plurality of consecutive cell acquisition subframes, the terminal device may receive the first physical broadcast channel in the plurality of consecutive cell acquisition subframes, so that the terminal device can receive the first physical broadcast channel faster. Therefore, efficiency of receiving a physical broadcast channel by the terminal device is improved.

Specifically, when the plurality of cell acquisition subframes in which a physical broadcast channel is transmitted are cell acquisition subframes in a radio frame whose system frame number is an integer multiple of 4, the terminal device may receive the first physical broadcast channel in cell acquisition subframes in radio frames whose system frame numbers are respectively 0, 4, 8, and 12. When the plurality of cell acquisition subframes in which a physical broadcast channel is transmitted may be subframes whose subframe numbers are an integer multiple of 14, the terminal device may receive the first physical broadcast channel in subframes whose subframe numbers are respectively 0, 14, 28, and 42. When the plurality of cell acquisition subframes in which a first physical broadcast channel is transmitted may be subframes whose timeslot numbers are an integer multiple of 14, the terminal device may receive the first physical broadcast channel in subframes whose timeslot numbers are respectively 0, 14, 28, and 42.

It should be noted that a subframe through which the terminal device receives the first physical broadcast channel is not limited to the foregoing subframes, and the foregoing subframes in which the first physical broadcast channel is transmitted are only used for explanation but are not construed as a limitation on this application.

After obtaining the downlink bandwidth configuration information, the terminal device determines the policy of receiving a first physical broadcast channel based on the bandwidth configuration value corresponding to the downlink bandwidth configuration information and the first threshold.

The policy of receiving a first physical broadcast channel corresponds to the policy of sending a first physical broadcast channel. When the bandwidth configuration value corresponding to the downlink bandwidth configuration information is greater than the first threshold, or the bandwidth value is greater than the first bandwidth threshold, the policy of receiving a first physical broadcast channel is that the terminal device receives a first physical broadcast channel in a plurality of cell acquisition subframes, and repeatedly receives the first physical broadcast channel in at least one cell acquisition subframe in which the first physical broadcast channel is transmitted.

The policy of receiving a first physical broadcast channel corresponds to the policy of sending a first physical broadcast channel. When the bandwidth configuration value corresponding to the downlink bandwidth configuration information is greater than the first threshold and less than the second threshold, or the bandwidth value is greater than the first bandwidth threshold and less than the second bandwidth threshold, the terminal device determines the first cell acquisition subframe based on the selecting manner agreed with the network device, repeatedly receives the first physical broadcast channel in the first cell acquisition subframe, but receives the first physical broadcast channel only once in another subframe that is not a first cell acquisition subframe. For an explanation of the agreed selecting manner, refer to the foregoing embodiments. To avoid redundancy, details are not described herein again.

When the bandwidth configuration value corresponding to the downlink bandwidth configuration information is greater than the second threshold, or the bandwidth value is greater than the second bandwidth threshold, the policy of receiving a first physical broadcast channel is that the terminal device repeatedly receives the first physical broadcast channel in each cell acquisition subframe in which the first physical broadcast channel is transmitted.

When the bandwidth configuration value corresponding to the downlink bandwidth configuration information is equal to the second threshold, or the bandwidth value is equal to the second bandwidth threshold, the policy of receiving a first physical broadcast channel corresponds to the policy of sending a first physical broadcast channel. The policy of sending a first physical broadcast channel when the bandwidth configuration value corresponding to the downlink bandwidth configuration information is equal to the second threshold is the same as the policy of sending a first physical broadcast channel when the bandwidth configuration value corresponding to the downlink bandwidth configuration information is greater than the second threshold. In this case, the policy of receiving a first physical broadcast channel is also the same as the policy of receiving a first physical broadcast channel when the bandwidth configuration value corresponding to the downlink bandwidth configuration information is greater than the second threshold. The policy of sending a first physical broadcast channel when the bandwidth configuration value corresponding to the downlink bandwidth configuration information is equal to the second threshold is the same as the policy of sending a first physical broadcast channel when the bandwidth configuration value corresponding to the downlink bandwidth configuration information is less than the second threshold and greater than the first threshold. In this case, the policy of receiving a first physical broadcast channel is also the same as the policy of receiving a first physical broadcast channel when the bandwidth configuration value corresponding to the downlink bandwidth configuration information is less than the second threshold and greater than the first threshold.

When the bandwidth configuration value corresponding to the downlink bandwidth configuration information is less than the first threshold, or the bandwidth value is less than the first bandwidth threshold, the plurality of cell acquisition subframes in which the first physical broadcast channel is transmitted each are a second cell acquisition subframe. A maximum of four symbols of the first physical broadcast channel are transmitted in the second cell acquisition subframe. When the bandwidth configuration value corresponding to the downlink bandwidth configuration information is less than the first threshold, the policy of receiving a first physical broadcast channel is that the terminal device receives the first physical broadcast channel only once in each cell acquisition subframe in which the first physical broadcast channel is transmitted.

When the bandwidth configuration value corresponding to the downlink bandwidth configuration information is equal to the first threshold, or the bandwidth value is greater than the first bandwidth threshold, the plurality of cell acquisition subframes in which the first physical broadcast channel is transmitted include at least one cell acquisition subframe that is not a first cell acquisition subframe, or the plurality of cell acquisition subframes in which the first physical broadcast channel is transmitted each are a second cell acquisition subframe.

The policy of receiving a first physical broadcast channel when the bandwidth configuration value corresponding to the downlink bandwidth configuration information is equal to the first threshold may be the same as the policy of receiving a first physical broadcast channel when the bandwidth configuration value corresponding to the downlink bandwidth configuration information is greater than the first threshold and less than the second threshold, and may be the same as the policy of receiving a first physical broadcast channel when the bandwidth configuration value corresponding to the downlink bandwidth configuration information is less than the first threshold. It should be noted that the sending policy corresponds to the receiving policy. The policy of sending a first physical broadcast channel when the bandwidth configuration value corresponding to the downlink bandwidth configuration information is equal to the first threshold is the same as the policy of sending a first physical broadcast channel when the bandwidth configuration value corresponding to the downlink bandwidth configuration information is greater than the first threshold and less than the second threshold. In this case, the policy of receiving a first physical broadcast channel is also the same as the policy of receiving a first physical broadcast channel when the bandwidth configuration value corresponding to the downlink bandwidth configuration information is greater than the first threshold. The policy of sending a first physical broadcast channel when the bandwidth configuration value corresponding to the downlink bandwidth configuration information is equal to the first threshold is the same as the policy of sending a first physical broadcast channel when the bandwidth configuration value corresponding to the downlink bandwidth configuration information is less than the first threshold. In this case, the policy of receiving a first physical broadcast channel is also the same as the policy of receiving a first physical broadcast channel when the bandwidth configuration value corresponding to the downlink bandwidth configuration information is less than the first threshold.

It may be understood that the policy of receiving a first physical broadcast channel, obtained based on the bandwidth configuration value, the first threshold, and the second threshold, may also be used to receive another physical broadcast channel.

Specifically, the terminal device can determine a policy of receiving a physical broadcast channel based on the bandwidth configuration value corresponding to the downlink bandwidth configuration information and the first threshold, or determine the policy of receiving a physical broadcast channel based on the bandwidth value, the first bandwidth threshold, and the second bandwidth threshold.

In the technical solution of this embodiment of this application, the network device sends the first physical broadcast channel to the terminal device based on the downlink bandwidth configuration information. When the bandwidth configuration value corresponding to the downlink bandwidth configuration information is greater than the first threshold, the network device sends the first physical broadcast channel in the plurality of cell acquisition subframes, and repeatedly transmits the first physical broadcast channel in at least one of the plurality of cell acquisition subframes in which the first physical broadcast channel is sent. In this way, the network device can increase, by repeatedly sending the first physical broadcast channel in a subframe, a probability of sending the first physical broadcast channel. Therefore, a probability that the terminal device receives the first physical broadcast channel can be increased. Further, when the bandwidth configuration value corresponding to the downlink bandwidth configuration information is greater than the first threshold, the first physical broadcast channel is repeatedly sent in the subframe. This can prevent a case in which a small quantity of resource elements are used to transmit a physical downlink shared channel due to repeatedly sending a first physical broadcast channel in a subframe when the bandwidth is small, and ensure that the physical downlink shared channel is normally transmitted.

Figure 8:
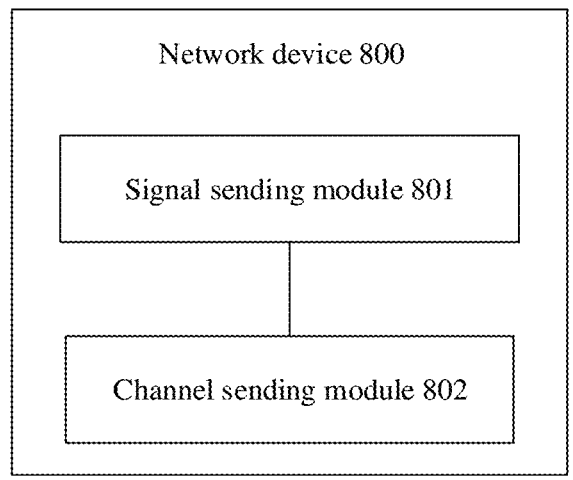
FIG. 8 is a schematic block diagram of a network device according to an embodiment of this application.

With reference to FIG. 8, this embodiment of this application provides a network device 800, including: a signal sending module 801, configured to send, on an MBMS-dedicated carrier, a signal for a terminal device to access the MBMS-dedicated carrier to the terminal device; and a channel sending module 802, configured to send a first physical broadcast channel to the terminal device in a plurality of cell acquisition subframes, where a time interval between every two adjacent cell acquisition subframes in the plurality of cell acquisition subframes is greater than or equal to 30 ms, the plurality of cell acquisition subframes in which the first physical broadcast channel is sent include at least one first cell acquisition subframe, and at least five symbols of the first physical broadcast channel are transmitted in the first cell acquisition subframe.

In the technical solution of this embodiment of this application, the network device sends the first physical broadcast channel in the plurality of cell acquisition subframes, and repeatedly sends the first physical broadcast channel in at least one of the plurality of cell acquisition subframes in which the first physical broadcast channel is sent. In this way, the network device can increase, by repeatedly sending the first physical broadcast channel in a subframe, a probability of sending the first physical broadcast channel. Therefore, a probability that the terminal device receives the first physical broadcast channel can be increased.

In some implementations, the network device 800 further includes: a bandwidth configuration determining module, configured to determine downlink bandwidth configuration information of the carrier or a cell.

The channel sending module 802 is specifically configured to: send the first physical broadcast channel to the terminal device in the plurality of cell acquisition subframes based on the downlink bandwidth configuration information, where when a bandwidth configuration value corresponding to the downlink bandwidth configuration information is greater than or equal to a first threshold, the plurality of cell acquisition subframes include at least one first cell acquisition subframe.

In some implementations, when the bandwidth configuration value corresponding to the downlink bandwidth configuration information is greater than the first threshold and less than a second threshold, the plurality of cell acquisition subframes include at least one cell acquisition subframe that is not the first cell acquisition subframe, and the second threshold is greater than the first threshold.

In some implementations, when the bandwidth configuration value corresponding to the downlink bandwidth configuration information is greater than the second threshold, the plurality of cell acquisition subframes each are the first cell acquisition subframe, and the second threshold is greater than the first threshold.

In some implementations, when the bandwidth configuration value corresponding to the downlink bandwidth configuration information is equal to the second threshold, the plurality of cell acquisition subframes include at least one cell acquisition subframe that is not the first cell acquisition subframe, or the plurality of cell acquisition subframes each are the first cell acquisition subframe.

In some implementations, the network device 800 further includes: a bandwidth configuration information sending module, configured to send a second physical broadcast channel to the terminal device, where the second physical broadcast channel carries master information block-multimedia broadcast multicast service information, and the master information block-multimedia broadcast multicast service information includes the downlink bandwidth configuration information.

It should be noted that an explanation and a technical effect of the physical channel transmission method in the foregoing embodiments are also applicable to the network device of this embodiment. To avoid redundancy, details are not described herein again.

Figure 9:
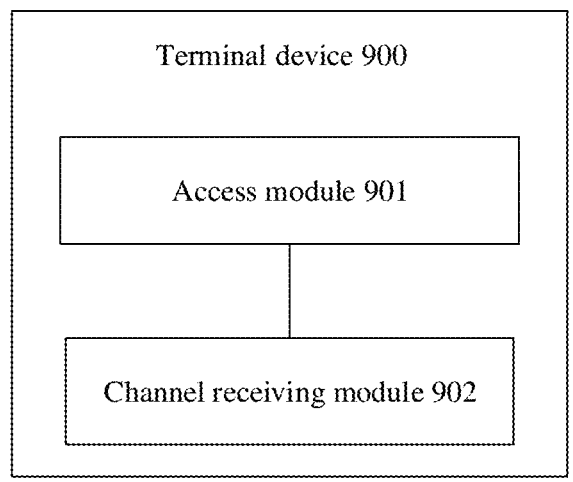
FIG. 9 is a schematic block diagram of a terminal device according to an embodiment of this application.

With reference to FIG. 9, an implementation of this application provides a terminal device 900, including: an access module 901, configured to access an MBMS-dedicated carrier; and a channel receiving module 902, configured to receive, in a plurality of cell acquisition subframes, a first physical broadcast channel sent by a network device, where a time interval between every two adjacent cell acquisition subframes in the plurality of cell acquisition subframes is greater than or equal to 30 ms, the plurality of cell acquisition subframes in which the first physical broadcast channel is sent include at least one first cell acquisition subframe, and at least five symbols of the first physical broadcast channel are transmitted in the first cell acquisition subframe.

In the technical solution of this embodiment of this application, the network device transmits the first physical broadcast channel in the plurality of cell acquisition subframes, and repeatedly transmits the first physical broadcast channel in at least one of the plurality of cell acquisition subframes in which the first physical broadcast channel is transmitted. In this way, the terminal device can increase, by repeatedly receiving the first physical broadcast channel in the cell acquisition subframe, a probability of sending the first physical broadcast channel. Therefore, a probability that the terminal device receives the first physical broadcast channel is increased.

In some implementations, the terminal device further includes: a configuration information determining module, configured to determine downlink bandwidth configuration information.

The channel receiving module 902 is specifically configured to: receive the first physical broadcast channel in the plurality of cell acquisition subframes based on the downlink bandwidth configuration information, where when a bandwidth configuration value corresponding to the downlink bandwidth configuration information is greater than or equal to a first threshold, the plurality of cell acquisition subframes include at least one first cell acquisition subframe.

In some implementations, when the bandwidth configuration value corresponding to the downlink bandwidth configuration information is greater than the first threshold and less than a second threshold, the plurality of cell acquisition subframes include at least one cell acquisition subframe that is not the first cell acquisition subframe, and the second threshold is greater than the first threshold.

In some implementations, when the bandwidth configuration value corresponding to the downlink bandwidth configuration information is greater than the second threshold, the plurality of cell acquisition subframes each are the first cell acquisition subframe.

In some implementations, when the bandwidth configuration value corresponding to the downlink bandwidth configuration information is equal to the second threshold, the plurality of cell acquisition subframes include at least one cell acquisition subframe that is not the first cell acquisition subframe, or the plurality of cell acquisition subframes each are the first cell acquisition subframe.

In some implementations, the terminal device 900 further includes: a bandwidth configuration information obtaining module, configured to receive a second physical broadcast channel sent by the network device, where the second physical broadcast channel carries master information block-multimedia broadcast multicast service information, and the master information block-multimedia broadcast multicast service information includes the downlink bandwidth configuration information.

It should be noted that the explanation and the technical effect of the physical channel transmission method in the foregoing embodiments are also applicable to the terminal device of this embodiment. To avoid redundancy, details are not described herein again.

An embodiment of this application provides a network device. The network device includes a processor and a memory. The memory stores computer instructions. The processor executes the computer instructions stored in the memory, to enable the network device to execute the physical channel transmission method according to any one of the foregoing embodiments.

Figure 10:
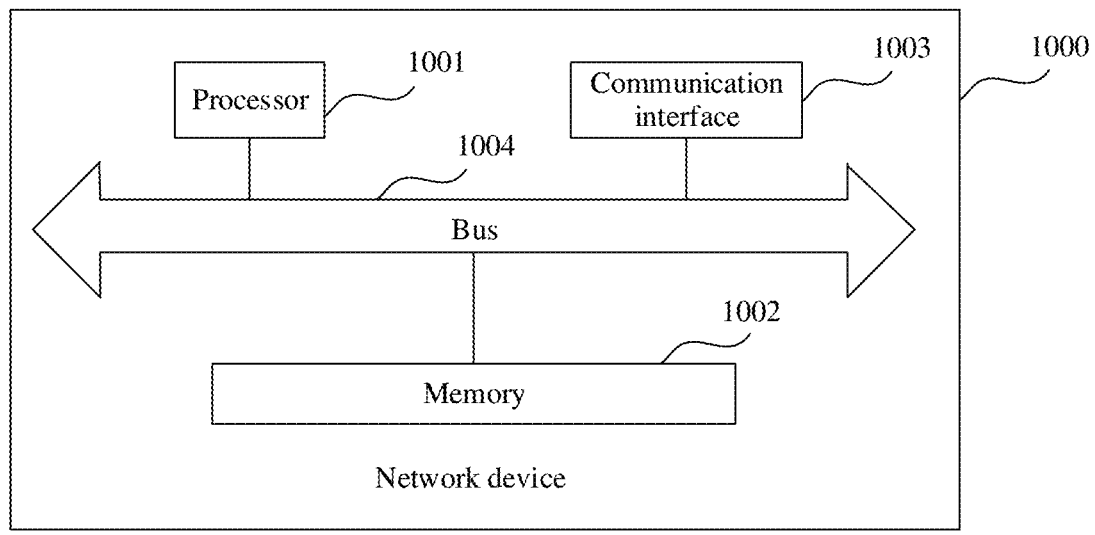
FIG. 10 is a schematic diagram of a structure of a network device according to an embodiment of this application.

Optionally, FIG. 10 schematically provides a possible basic hardware architecture of a network device 1000 described in this application.

With reference to FIG. 10, the network device 1000 includes a processor 1001, a memory 1002, a communication interface 1003, and a bus 1004.

The network device 1000 may include one or more processors 1001. FIG. 10 shows only one of the processors 1001. Optionally, the processor 1001 may be a central processing unit (CPU). If the network device 1000 includes a plurality of processors 1001, types of the plurality of processors 1001 may be different, or may be the same. Optionally, the plurality of processors 1001 of the network device 1000 may also be integrated into a multi-core processor.

The memory 1002 stores computer instructions and data. The memory 1002 may store computer instructions and data that are used to implement the physical broadcast channel transmission method provided in this application. For example, the memory 1002 stores instructions used to implement the steps of the physical broadcast channel transmission method. The memory 1002 may be any one or any combination of the following storage media: a nonvolatile memory (for example, a read-only memory (ROM), a solid-state drive (SSD), a hard disk drive (HDD), or a compact disc) and a volatile memory.

The communication interface 1003 may be any one or any combination of the following components with a network access function: a network interface (for example, an Ethernet interface) and a wireless network interface card.

The communication interface 1003 is configured to perform data communication between the network device 1000 and another computing device or another terminal.

The processor 1001 may be connected to the memory 1002 and the communication interface 1003 by using the bus 1004. In this way, the processor 1001 may access the memory 1002 by using the bus 1004, and may interact data with another network device or another terminal device through the communication interface 1003.

In this application, the network device 1000 executes the computer instructions in the memory 1002, to enable the network device 1000 to implement the physical broadcast channel transmission method provided in this application.

An embodiment of this application provides a terminal device. The terminal device includes a processor and a memory. The memory stores computer instructions. The processor executes the computer instructions stored in the memory, to enable the terminal device to perform the physical broadcast channel transmission method according to any one of the foregoing embodiments.

Figure 11:
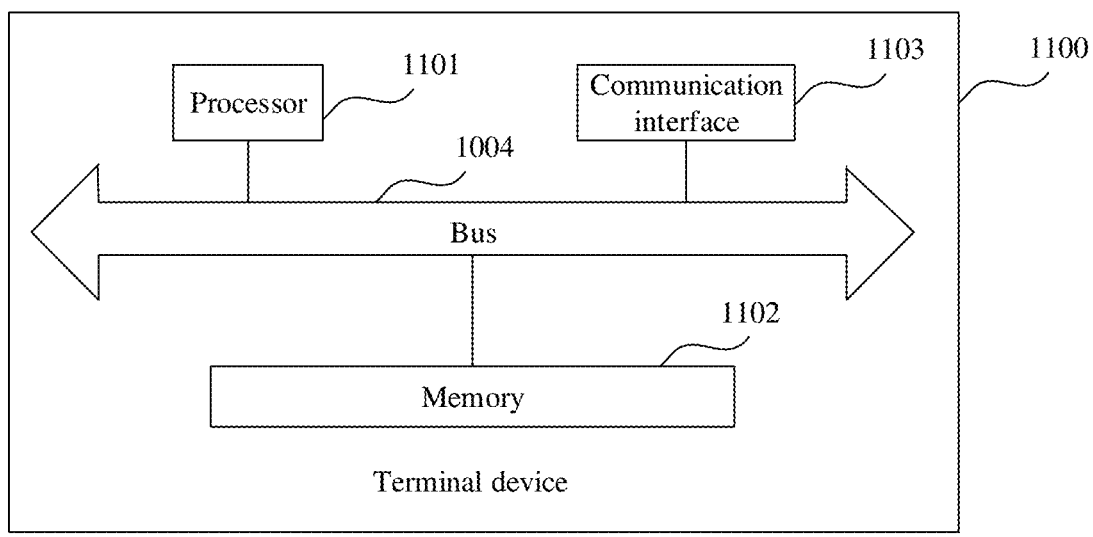
FIG. 11 is a schematic diagram of a structure of a terminal device according to an embodiment of this application.

Optionally, FIG. 11 schematically provides a possible basic hardware architecture of a terminal device 1100 described in this application.

With reference to FIG. 11, the terminal device 1100 includes a processor 1101, a memory 1102, a communication interface 1103, and a bus 1104.

The terminal device 1100 may include one or more processors 1101. FIG. 11 shows only one of the processors 1101. Optionally, the processor 1101 may be a central processing unit (CPU). If the terminal device 1100 includes a plurality of processors 1101, types of the plurality of processors 1101 may be different, or may be the same. Optionally, the plurality of processors 1101 of the network device 1100 may also be integrated into a multi-core processor.

The memory 1102 stores computer instructions and data. The memory 1102 may store computer instructions and data that are used to implement the physical broadcast channel transmission method provided in this application, for example, the memory 1102 stores instructions used to implement the steps of the physical broadcast channel transmission method. The memory 1102 may be any one or any combination of the following storage media: a nonvolatile memory (for example, a read-only memory (ROM), a solid-state drive (SSD), a hard disk drive (HDD), or a compact disc) and a volatile memory.

The communication interface 1103 may be any one or any combination of the following components with a network access function: a network interface (for example, an Ethernet interface) and a wireless network interface card.

The communication interface 1103 is configured to perform data communication between the terminal device 1100 and another computing device or another terminal device.

The processor 1101 may be connected to the memory 1102 and the communication interface 1103 by using the bus 1104. In this way, the processor 1101 may access the memory 1102 by using the bus 1104, and may interact data with another network device or another terminal device through the communication interface 1103.

In this application, the terminal device 1100 executes the computer instructions in the memory 1102, to enable the terminal device 1100 to implement the physical broadcast channel transmission method provided in this application.

This application provides a computer-readable storage medium. The computer-readable storage medium stores computer instructions. The computer instructions instruct a network device to perform the physical broadcast channel transmission method according to any one of the foregoing embodiments.

This application provides a computer-readable storage medium. The computer-readable storage medium stores computer instructions. The computer instructions instruct a terminal device to perform the physical broadcast channel transmission method according to any one of the foregoing embodiments.

It should be understood that, the processor mentioned in embodiments of this application may be a central processing unit (CPU), or may be another general-purpose processor, a digital signal processor (DSP), an application specific integrated circuit (ASIC), a field programmable gate array (FPGA), or another programmable logic device, discrete gate or transistor logic device, discrete hardware component, or the like. The general-purpose processor may be a microprocessor, or the processor may be any conventional processor, or the like.

It may be further understood that the memory mentioned in embodiments of this application may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. Through example but not limitative descriptions, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM).

It should be noted that when the processor is a general-purpose processor, a DSP, an ASIC, an FPGA or another programmable logic device, a discrete gate, a transistor logic device, or a discrete hardware component, the memory (a storage module) is integrated into the processor.

It should be noted that the memory described in this specification aims to include but is not limited to these memories and any memory of another proper type.

It should be understood that sequence numbers of the foregoing processes do not mean execution sequences in various embodiments of this application. The execution sequences of the processes should be determined according to functions and internal logic of the processes, and should not be construed as any limitation on the implementation processes of embodiments of this application.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units are integrated into one unit.

If the functions are implemented in a form of a software functional unit and sold or used as an independent product, the functions may be stored in a computer-readable storage medium. Based on such an understanding, the technical solutions of this application essentially, or a part contributing to the prior art, or a part of the technical solutions may be implemented in a form of a software product. The computer software product is stored in a storage medium, and includes several instructions for instructing a computer device (which may be a personal computer, a server, a network device, or the like) to perform all or some of the steps of the methods described in embodiments of this application. The foregoing storage medium includes any medium that can store program code, such as a USB flash drive, a removable hard disk, a read-only memory (ROM), a random access memory (RAM), a magnetic disk, or an optical disc.

A sequence of the steps of the method in embodiments of this application may be adjusted, combined, or removed based on an actual requirement.

The modules in the apparatus in embodiments of this application may be combined, divided, and deleted based on an actual requirement.

In conclusion, the foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of embodiments of this application.

What is claimed is:

1. A method, comprising:
   receiving, on a multimedia broadcast multicast service (MBMS)-dedicated carrier, a signal configured for a terminal device to use to access the MBMS-dedicated carrier;
   accessing the MBMS-dedicated carrier;
   determining downlink bandwidth configuration information, wherein the downlink bandwidth configuration information is for configuring bandwidth of the MBMS-dedicated carrier or bandwidth of a cell corresponding to the MBMS-dedicated carrier; and
   receiving, in a plurality of cell acquisition subframes, a first physical broadcast channel from a network device, wherein a time interval between every two adjacent cell acquisition subframes in the plurality of cell acquisition subframes is greater than or equal to 30 ms, and
   wherein the receiving, in the plurality of cell acquisition subframes, the first physical broadcast channel from the network device comprises:
   when a bandwidth configuration value corresponding to the downlink bandwidth configuration information is greater than or equal to a first threshold corresponding to a first bandwidth threshold in the frequency domain, receiving at least five symbols of the first physical broadcast channel in a first cell acquisition subframe of at least one first cell acquisition subframe, wherein the plurality of cell acquisition subframes comprises the at least one first cell acquisition subframe, and
   wherein when the bandwidth configuration value corresponding to the downlink bandwidth configuration information is greater than the first threshold and less than or equal to a second threshold corresponding to a second bandwidth threshold, the plurality of cell acquisition subframes comprise at least one cell acquisition subframe that is not included in the at least one first cell acquisition subframe, and the second threshold is greater than the first threshold.

2. The method according to claim 1, wherein when the bandwidth configuration value corresponding to the downlink bandwidth configuration information is equal to the second threshold corresponding to the second bandwidth threshold:
   the plurality of cell acquisition subframes comprise at least one cell acquisition subframe that is not included in the at least one first cell acquisition subframe; or
   each cell acquisition subframe of the plurality of cell acquisition subframes is included in the at least one first cell acquisition subframe.

3. The method according to claim 1, further comprising:
   before receiving, in the plurality of cell acquisition subframes, the first physical broadcast channel sent by the network device, receiving a second physical broadcast channel sent by the network device, wherein the second physical broadcast channel carries master information block-multimedia broadcast multicast service information, and the master information block-multimedia broadcast multicast service information comprises the downlink bandwidth configuration information.

4. A terminal device communication apparatus, comprising:
   a transceiver;
   at least one processor; and
   one or more non-transitory memories coupled to the at least one processor and storing programming instructions that are executable by the at least one processor, wherein execution of the programming instructions causes the terminal device communication apparatus to:
   receive, on a multimedia broadcast multicast service (MBMS)-dedicated carrier, a signal configured for the terminal device communication apparatus to use to access the MBMS-dedicated carrier;
   access the MBMS-dedicated carrier;
   determine downlink bandwidth configuration information, wherein the downlink bandwidth configuration information is for configuring bandwidth of the MBMS-dedicated carrier or bandwidth of a cell corresponding to the MBMS-dedicated carrier; and
   receive, in a plurality of cell acquisition subframes, a first physical broadcast channel from a network device based on the downlink bandwidth configuration information, wherein a time interval between every two adjacent cell acquisition subframes in the plurality of cell acquisition subframes is greater than or equal to 30 ms, and wherein receiving, in the plurality of cell acquisition subframes, the first physical broadcast channel from the network device comprises:

when a bandwidth configuration value corresponding to the downlink bandwidth configuration information is greater than or equal to a first threshold corresponding to a first bandwidth threshold in the frequency domain, receiving at least five symbols of the first physical broadcast channel in a first cell acquisition subframe of at least one first cell acquisition subframe, wherein the plurality of cell acquisition subframes comprises the at least one first cell acquisition subframe, and wherein when the bandwidth configuration value corresponding to the downlink bandwidth configuration information is greater than the first threshold and less than or equal to a second threshold corresponding to a second bandwidth threshold, the plurality of cell acquisition subframes comprise at least one cell acquisition subframe that is not included in the at least one first cell acquisition subframe, and the second threshold is greater than the first threshold.

5. The terminal device communication apparatus according to claim 4, wherein when the bandwidth configuration value corresponding to the downlink bandwidth configuration information is equal to the second threshold corresponding to the second bandwidth threshold:

the plurality of cell acquisition subframes comprises at least one cell acquisition subframe that is not included in the at least one first cell acquisition subframe; or each cell acquisition subframe of the plurality of cell acquisition subframes is included in the at least one first cell acquisition subframe.

6. The terminal device communication apparatus according to claim 4, wherein the programming instructions, when executed by the at least one processor, further cause the terminal device communication apparatus to:

receive a second physical broadcast channel sent by the network device, wherein the second physical broadcast channel carries master information block-multimedia broadcast multicast service information, and the master information block-multimedia broadcast multicast service information comprises the downlink bandwidth configuration information.

7. The method according to claim 1, wherein, when the bandwidth configuration value corresponding to the downlink bandwidth configuration information is greater than or equal to the first threshold corresponding to the first bandwidth threshold, the first physical broadcast channel is repeatedly received in the at least one first cell acquisition subframe of the plurality of cell acquisition subframes.

8. A method, comprising:

sending, by a network device to a terminal device on a multimedia broadcast multicast service (MBMS)-dedicated carrier, a signal configured for the terminal device to use to access the MBMS-dedicated carrier;

determining, by the network device, downlink bandwidth configuration information of the MBMS-dedicated carrier or a cell corresponding to the MBMS-dedicated carrier; and sending, by the network device, a first physical broadcast channel to the terminal device in a plurality of cell acquisition subframes, wherein a time interval between every two adjacent cell acquisition subframes in the plurality of cell acquisition subframes is greater than or equal to 30 ms, wherein the sending, by the network device, the first physical broadcast channel to the terminal device in the plurality of cell acquisition subframes comprises:

when a bandwidth configuration value corresponding to the downlink bandwidth configuration information is greater than or equal to a first threshold corresponding to a first bandwidth threshold in the frequency domain, sending, by the network device, at least five symbols of the first physical broadcast channel in a first cell acquisition subframe of at least one first cell acquisition subframe, wherein the plurality of cell acquisition subframes comprises the at least one first cell acquisition subframe, and wherein when the bandwidth configuration value corresponding to the downlink bandwidth configuration information is greater than the first threshold and less than or equal to a second threshold corresponding to a second bandwidth threshold, the plurality of cell acquisition subframes comprise at least one cell acquisition subframe that is not included in the at least one first cell acquisition subframe, and the second threshold is greater than the first threshold.

9. The method according to claim 8, wherein when the bandwidth configuration value corresponding to the downlink bandwidth configuration information is equal to the second threshold:

the plurality of cell acquisition subframes comprises at least one cell acquisition subframe that is not included in the at least one first cell acquisition subframe; or each cell acquisition subframe of the plurality of cell acquisition subframes is included in the at least one first cell acquisition subframe.

10. The method according to claim 8, further comprising:

before sending, by the network device, the first physical broadcast channel to the terminal device in the plurality of cell acquisition subframes, sending, by the network device, a second physical broadcast channel to the terminal device, wherein the second physical broadcast channel carries master information block-multimedia broadcast multicast service information, and the master information block-multimedia broadcast multicast service information comprises the downlink bandwidth configuration information.

11. A communication apparatus, comprising:

a transceiver;

at least one processor; and one or more non-transitory memories coupled to the at least one processor and storing programming instructions that are executable by the at least one processor, wherein execution of the programming instructions causes the communication apparatus to:

send, to a terminal device on a multimedia broadcast multicast service (MBMS)-dedicated carrier, a signal configured for the terminal device to use to access the MBMS-dedicated carrier;

determine downlink bandwidth configuration information of the MBMS-dedicated carrier or a cell corresponding to the MBMS-dedicated carrier; and send a first physical broadcast channel to the terminal device in a plurality of cell acquisition subframes, wherein a time interval between every two adjacent cell acquisition subframes in the plurality of cell acquisition subframes is greater than or equal to 30 ms, wherein sending the first physical broadcast channel to the terminal device in the plurality of cell acquisition subframes comprises:
when a bandwidth configuration value corresponding to the downlink bandwidth configuration information is greater than or equal to a first threshold corresponding to a first bandwidth threshold in the frequency domain, sending at least five symbols of the first physical broadcast channel in a first cell acquisition subframe of at least one first cell acquisition subframe, wherein the plurality of cell acquisition subframes comprises the at least one first cell acquisition subframe, and
wherein when the bandwidth configuration value corresponding to the downlink bandwidth configuration information is greater than the first threshold and less than or equal to a second threshold corresponding to a second bandwidth threshold, the plurality of cell acquisition subframes comprise at least one cell acquisition subframe that is not included in the at least one first cell acquisition subframe, and the second threshold is greater than the first threshold.

12. The communication apparatus according to claim 11, wherein when the bandwidth configuration value corresponding to the downlink bandwidth configuration information is equal to the second threshold:
the plurality of cell acquisition subframes comprises at least one cell acquisition subframe that is not included in the at least one first cell acquisition subframe; or
each cell acquisition subframe of the plurality of cell acquisition subframes is included in the at least one first cell acquisition subframe.

13. The communication apparatus according to claim 11, wherein the programming instructions, when executed by the at least one processor, further cause the communication apparatus to:
before sending the first physical broadcast channel to the terminal device in the plurality of cell acquisition subframes, send a second physical broadcast channel to the terminal device, wherein the second physical broadcast channel carries master information block-multimedia broadcast multicast service information, and the master information block-multimedia broadcast multicast service information comprises the downlink bandwidth configuration information.

\* \* \* \* \*